(12) United States Patent
Hugenroth

(10) Patent No.: US 6,623,244 B2
(45) Date of Patent: Sep. 23, 2003

(54) HEATER MATERIAL

(75) Inventor: Jason Hugenroth, Hope, AR (US)

(73) Assignee: Scroll Technologies, Arkadelphia, AK (US)

( * ) Notice: Subject to any disclaimer, the term of this patent is extended or adjusted under 35 U.S.C. 154(b) by 0 days.

(21) Appl. No.: 10/000,616

(22) Filed: Nov. 1, 2001

(65) Prior Publication Data

US 2002/0076333 A1 Jun. 20, 2002

Related U.S. Application Data

(63) Continuation-in-part of application No. 09/576,571, filed on May 22, 2000, now Pat. No. 6,364,619.

(51) Int. Cl.[7] .......................... F04B 49/10; F04B 49/06; F04B 17/00
(52) U.S. Cl. ..................... 417/32; 417/44.1; 417/410.5; 323/907
(58) Field of Search ...................... 417/32, 44.1, 410.5; 323/907

(56) References Cited

U.S. PATENT DOCUMENTS

| | | | | |
|---|---|---|---|---|
| 3,636,426 A | * | 1/1972 | Buiting | 318/471 |
| 4,376,926 A | * | 3/1983 | Senor | 337/104 |
| RE31,367 E | * | 8/1983 | D'Entremont | 361/27 |
| 4,486,732 A | * | 12/1984 | Wells et al. | 337/100 |
| 4,683,515 A | * | 7/1987 | Beihoff et al. | 361/106 |
| 5,118,260 A | * | 6/1992 | Fraser, Jr. | 417/18 |
| 5,200,872 A | * | 4/1993 | D'Entremont et al. | 310/68 C |
| 5,345,126 A | * | 9/1994 | Bunch | 310/68 C |
| 5,395,224 A | * | 3/1995 | Caillat et al. | 418/100 |
| 5,690,475 A | * | 11/1997 | Yamada et al. | 236/93 R |

* cited by examiner

*Primary Examiner*—Cheryl J. Tyler
*Assistant Examiner*—Timothy P. Solak
(74) *Attorney, Agent, or Firm*—Carlson, Gaskey & Olds

(57) ABSTRACT

A scroll compressor is provided with a thermostat selectively closing when predetermined temperatures are reached to deliver current to a heater associated with a motor protector switch. The thermostat is able to more quickly close in response to undesirable conditions in the compressor, than would be the case with the motor protector switch typically found at the motor. The circuit associated with the motor protector switch preferably includes at least two heaters, with the normal heater associated with the power lines leading to the motor performing its normal function. The thermostat is preferably associated with an auxiliary heater. In another feature, a heater is preferably formed with a thick film technology directly onto an insulator element within the motor protector body.

8 Claims, 2 Drawing Sheets

HEATER MATERIAL

This application is a continuation-in-part of U.S. patent application Ser. No. 09/576,571, now U.S. Pat. No. 6,364,619, entitled "Sealed Compressor with Temperature Feedback to Motor Protector Unit" and filed on May 22, 2000.

BACKGROUND OF THE INVENTION

This invention relates to a unique heater element provided within a motor protection circuit for a scroll compressor motor.

Scroll compressors are becoming widely utilized in refrigerant compression applications. In a scroll compressor, a first scroll member orbits relative to a second scroll member. Each of the scroll members has a base with a generally spiral wrap extending from its base. The wraps interfit to define compression chambers which are reduced in volume as the two orbit relative to each other.

There are many challenges in the design of scroll compressors. One major challenge relates to a loss of charge in the refrigerant system associated with refrigerant compression. In a loss of charge situation, the amount of refrigerant circulating within the refrigerant cycle is reduced, such as by a leak. Under such conditions, continued operation of the refrigerant cycle is undesirable. Other problems in the system can result in increased temperatures within the compressor. One such problem is so-called reverse-rotation, which can occur such as when a motor is improperly wired such that the system runs in a reverse direction.

Motors for compressors in refrigerant cycles, and in particular for scroll compressors are typically provided with a protector circuit. A motor protector circuit includes a switch which opens should a temperature associated with a protector switch exceed a predetermined maximum. Thus, should the operating temperature within the compressor exceed the expected normal temperature range, the switch will open. When the switch is open, the motor is stopped, thus stopping operation of the compressor.

In one proposed scroll compressor, a thermostat is associated with a location remote from the motor such that it may be positioned closer to the scroll members. The thermostat is operable to move to an actuated position when a predetermined temperature is reached. When the thermostat moves to its actuated position, current flows to a heater position near the motor protector switch. This increases the heat at the motor protector switch resulting in the switch opening at a potentially earlier point in time.

It would be desirable to better utilize the space within the motor protector switch by forming some components to be relatively small and simpler to produce. Moreover, it would be otherwise advantageous to simply the formation of the motor protector switch.

SUMMARY OF THE INVENTION

In a disclosed embodiment of this invention, the thermostat preferably communicates with a separate or auxiliary heater. The normal heaters which are typically included in the motor protector circuit operate with a normal function. The thermostat selectively delivers current to an auxiliary heater when closed to shut down operation. This simplifies the motor protector switch wiring.

In another feature of this invention, the heaters are formed by a printed thick film technology. So called "PTF" heaters are known, and are formed by printing conductive ink directly on to a substrate. One substrate that can include such heaters are ceramic substrates. Known motor protector devices already incorporate a ceramic insulator inside the protector switch. The inventive heater is thus printed directly on this ceramic insulator. By incorporating the heater into this existing ceramic insulator, less space is necessary, and the resulting protector body is less expensive and more reliable.

In a preferred embodiment the ceramic insulator positioned adjacent to the switch within the protector body receives a PTF or other thin film type heater.

These and other features of the present invention can be best understood from the following specification and drawings, the following of which is a brief description.

DETAILED DESCRIPTION OF A PREFERRED EMBODIMENT

Figure 1:
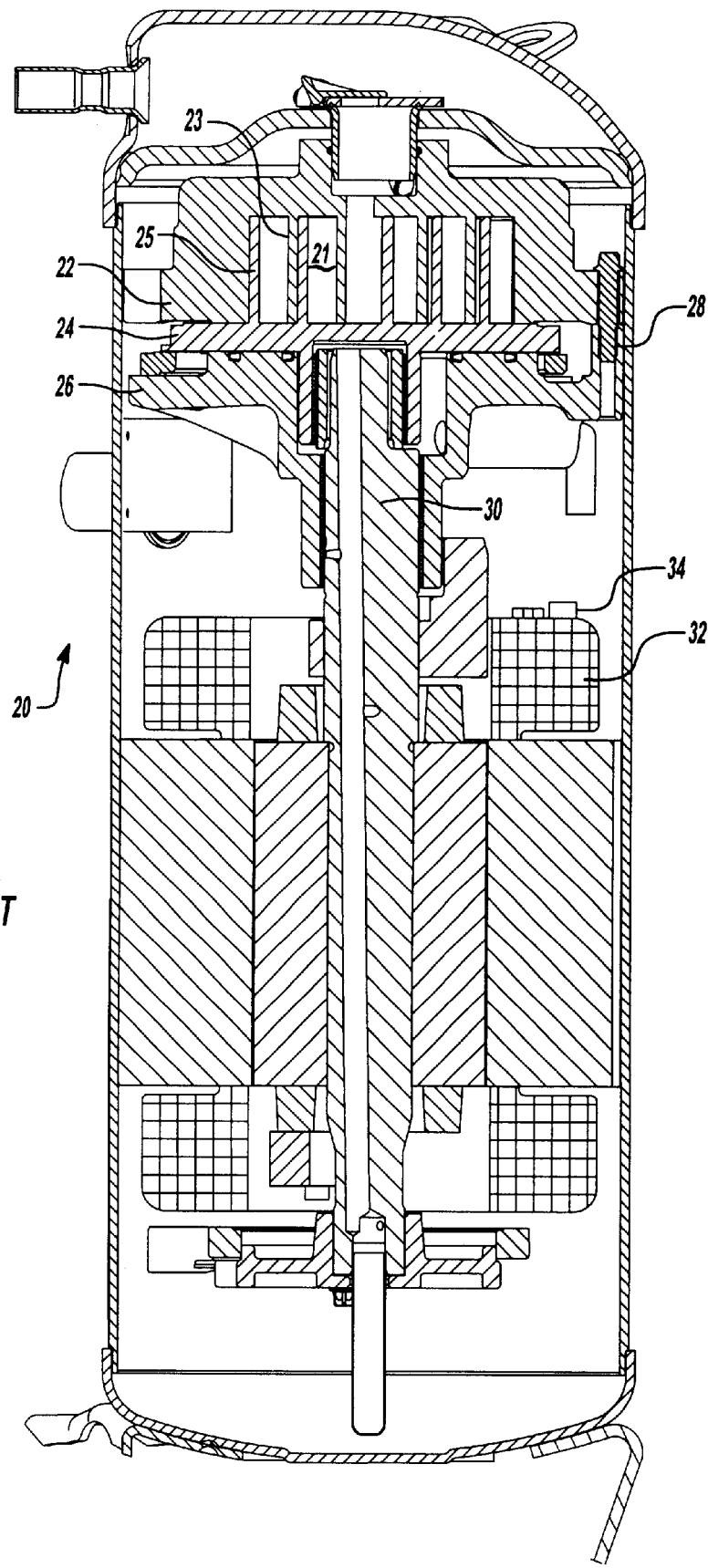
FIG. 1 shows a prior art scroll compressor.

FIG. 1 shows a prior art scroll compressor 20. As is known, a non-orbiting scroll 22 includes a wrap 23 which defines compression chambers 21 in combination with the wraps 25 from an orbiting scroll 24. A crankcase 26 supports the orbiting scroll 24. As known, the crankcase 26 includes a plurality of towers 28 which are spaced circumferentially about the crankcase 26. A shaft 30 is driven by an electric motor 32 to cause the orbiting scroll 24 to orbit through a connection such as is known.

A motor protector circuit 34 is associated with the motor. This circuit preferably is operable to sense changes in temperature, and stop operation of the motor 32. Several embodiments are disclosed in U.S. Pat. No. 6,364,619 entitled "Sealed Compressor with Temperature Feedback to Motor Protector Unit". Essentially, a thermostat is associated with the scroll members and closes when a particular temperature is reached. When the thermostat closes it directs current through a heater which is part of the motor protector circuit 34. The heater may be positioned adjacent but outside the protector switch, or within the protector switch. When the heater receives increased current, the switch within protector switch 34 opens to stop operation of the motor.

Figure 2A:
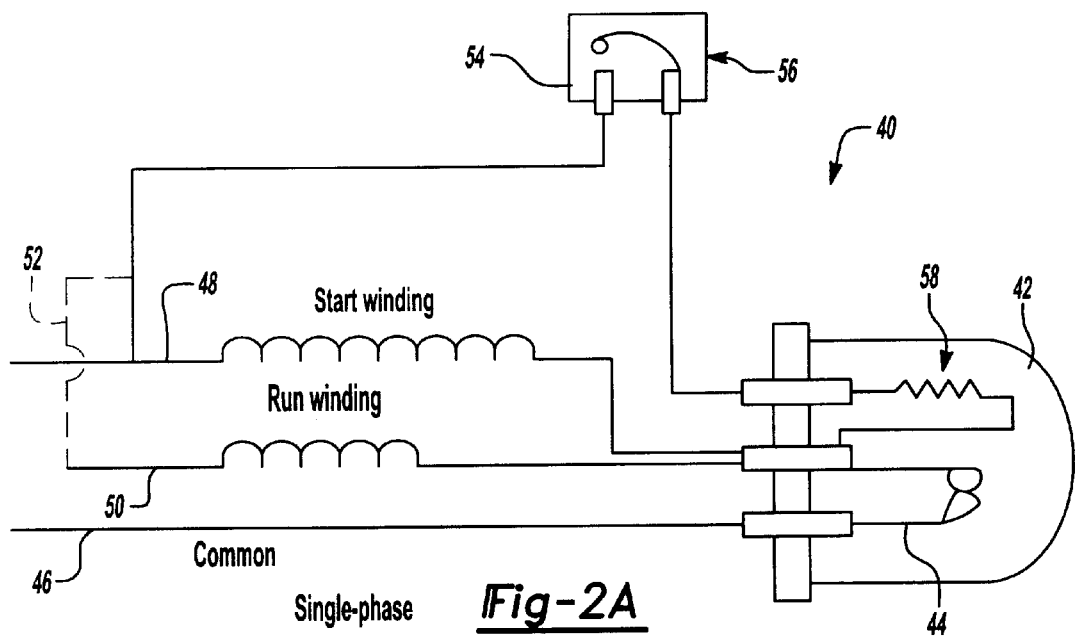
FIG. 2A shows a first circuit utilized with a single phase motor.

FIG. 2A shows a first embodiment circuit for the motor protector switch for a motor protector circuit 40. As shown, a protector switch body 42 includes a switch 44 which is selectively opened. As known, a common line 46 communicates with a start winding 48 and a run winding 50. In this embodiment, the start winding 48 is shown connected to a thermostat 54 having a switch 56. The thermostat 54 is positioned adjacent the pump unit, which comprises the two scroll members. As will be shown, most preferably, this thermostat 54 is positioned within both the crankcase and the non-orbiting scroll. The thermostat switch 56 when opened does not direct current to a heater 58. However, when closed, current does pass to the heater 58. This additional heat will cause the switch 44 to open more promptly than if the additional heater 58 was not actuated. As known, but not shown in the figure, other heaters are typically associated with the start winding and the run winding.

As shown in FIG. 2A, a jumper 52 could be provided between the run winding to supply power to the thermostat 54 in an alternative embodiment. That is, the run winding could power the thermostat 54 rather than the start winding 48.

Figure 2B:
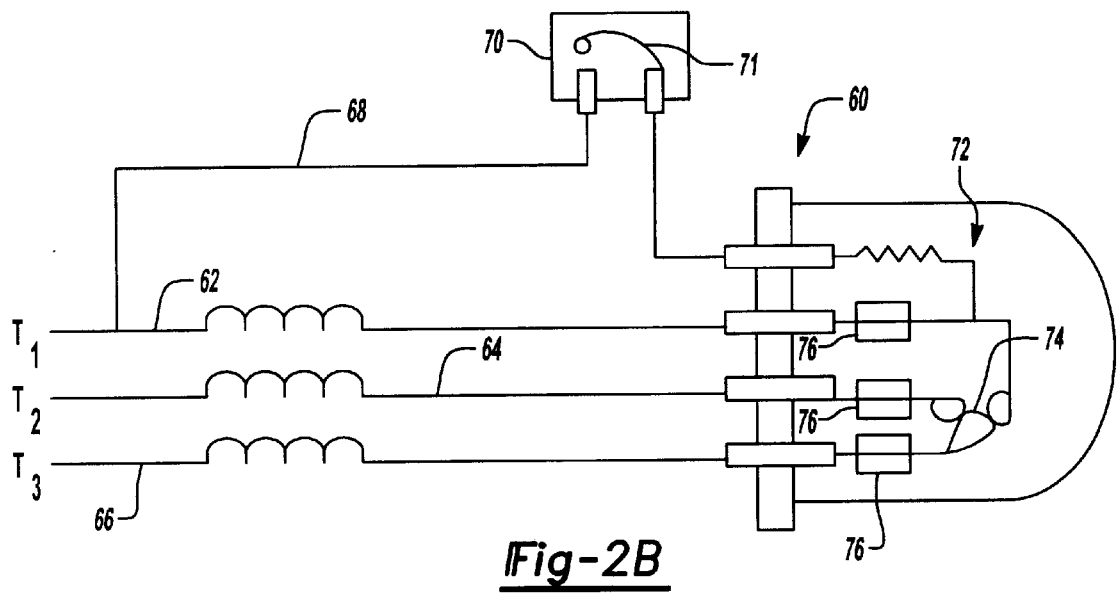
FIG. 2B shows a second circuit utilized with a three phase motor.

FIG. 2B shows another circuit 60 utilized with a three-phase motor. As is known, three power lines 62, 64, and 66 selectively drive the motor. A tap 68 delivers current to the thermostat 70. The thermostat 70 operates as the thermostat 54 and includes a switch 71 which selectively closes. A protector switch body 72 includes a switch 74 which will selectively open to stop operation of the compressor motor. As known, each line 62, 64 and 66 may be provided with its own heater 76, shown schematically. As with the prior embodiment, the use of the additional auxiliary heater 72 powered by the thermostat 70 will provide more prompt opening of the switch 74 since it is powered by an element more proximate to the compressor pump unit wherein the heat is initially likely to generate.

The aspect of auxiliary heater is inventive. The auxiliary heater provides a reliable way of quickly actuating the protective switch. Thus, the heaters normal associated with protector switch can still operate with their normal function. However, the thermostat and the auxiliary heater thus provide another measure of protection and one which is likely to be more quickly actuated.

Figure 3:
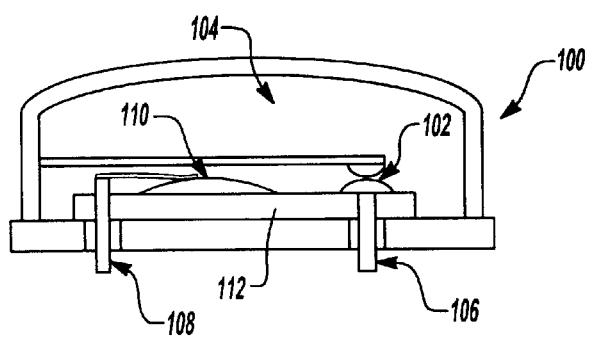
FIG. 3 shows an inventive protector circuit.

Another feature of this invention is the provision of a thin film heater on an element already within the protector body. Thus, as shown in FIG. 3, a motor protector body 100 includes its contact switch 102 which selectively opens to stop operation. As shown, the contact element includes a bi-metal member 104 which snaps between two positions when a predetermined temperature is reached. As known, when the bi-metal element is open, power will no longer flow to the motor 32.

A power lead pin 106 will typically contact the bi-metal element 104, except when it is in its open position. A heater lead pin 108 communicates with the thin film heater material 110.

Again, the technology for forming and utilizing thin film heaters is known. It is the provision of this heater on the ceramic insulator 112 which is already within the protective body which provides valuable benefits in the particular claimed environment.

Although preferred embodiments of this invention have been disclosed, a worker of ordinary skill in the art would recognize that many other modifications would come within the scope of this invention. For that reason, the following claims should be studied to determine the true scope and content of this invention.

What is claimed is:

1. A scroll compressor comprising:
a first scroll member having a base and a generally spiral wrap extending from its base;
a second scroll member having a base and a generally spiral wrap extending from its base;
a shaft for driving said second scroll member to orbit relative to said first scroll member, said shaft being driven by an electric motor;
a motor protector switch for selectively stopping operation of said motor, a thermostat associated with at least one of said first and second scroll members, said thermostat being operable to sense temperature from at least one of said first and second scroll members and to close once a particular temperature is reached, said thermostat selectively closing to deliver current to a first heater, said first heater associated with said motor protector switch, and power lines for delivering power to said motor, and communicating through said motor protector switch, and a second heater associated with at least one of said power lines;
said motor protector switch is provided with a thermal insulator body; and wherein said first heater is formed on said thermal insulator body and on a side of said insulator facing said motor protector switch;
wherein said heater and said thermal insulator body are received within a housing for said motor protector switch.

2. A scroll compressor as recited in claim 1, wherein said motor is receiving single phase electric power.

3. A scroll compressor as recited in claim 1, wherein said motor is receiving three-phase power.

4. A scroll compressor as recited in claim 1, wherein at least said first heater is formed by a thick film technology on said insulator body.

5. A scroll compressor as recited in claim 1, wherein said insulator body is formed of a ceramic material.

6. A scroll compressor comprising:
a first scroll member having a base and a generally spiral wrap extending from its base;
a second scroll member having a base and a generally spiral wrap extending from its base;
a shaft for driving said second scroll member to orbit relative to said first scroll member, said shaft being driven by an electric motor;
a motor protector switch for selectively stopping operation of said electric motor when a predetermined temperature is exceeded, and a heater associated with said motor protector switch, said motor protector switch further including a thermal insulator structure, said heater being formed on said insulator structure;
a thermostat associated with at least one of said first and second scroll members and operable to sense temperature from at least one of said first and second scroll members and to close once a particular temperature is reached, said thermostat selectively closing to deliver current to said heater;
wherein said heater and said thermal insulator structure are received within a housing for said motor protector switch.

7. A scroll compressor as recited in claim 6, wherein at least said first heater is formed by a thick film technology on said insulator body.

8. A scroll compressor as recited in claim 7, wherein said insulator body is formed of a ceramic material.

* * * * *